US008013572B2

(12) United States Patent
Rodgers

(10) Patent No.: US 8,013,572 B2
(45) Date of Patent: Sep. 6, 2011

(54) RECHARGING DEVICE FOR USE WITH PORTABLE ELECTRONIC DEVICES

(76) Inventor: Andrew Rodgers, East Windsor, NJ (US)

(*) Notice: Subject to any disclaimer, the term of this patent is extended or adjusted under 35 U.S.C. 154(b) by 817 days.

(21) Appl. No.: 11/784,271

(22) Filed: Apr. 6, 2007

(65) Prior Publication Data

US 2007/0236180 A1 Oct. 11, 2007

Related U.S. Application Data

(60) Provisional application No. 60/790,999, filed on Apr. 11, 2006.

(51) Int. Cl.
*H02J 7/00* (2006.01)
(52) U.S. Cl. ......... 320/114; 320/103; 320/112; 320/128
(58) Field of Classification Search ............... 320/103, 320/107, 112, 114, 128
See application file for complete search history.

(56) References Cited

U.S. PATENT DOCUMENTS

| 4,433,277 | A | * | 2/1984 | Carollo et al. ............. 320/149 |
| 5,229,703 | A | | 7/1993 | Harris |
| 5,525,888 | A | * | 6/1996 | Toya ........................... 320/111 |
| 5,572,401 | A | | 11/1996 | Carroll |
| 5,621,299 | A | * | 4/1997 | Krall ........................... 320/103 |
| 5,717,308 | A | * | 2/1998 | Nishitani et al. ............ 396/279 |
| 5,835,852 | A | | 11/1998 | Bundgardt |
| 5,859,481 | A | | 1/1999 | Banyas |
| 6,043,626 | A | | 3/2000 | Snyder et al. |
| 6,154,010 | A | * | 11/2000 | Geiger ........................... 320/137 |
| 6,184,654 | B1 | * | 2/2001 | Bachner et al. ............ 320/114 |
| 6,646,864 | B2 | | 11/2003 | Richardson |
| 6,853,293 | B2 | | 2/2005 | Swartz |
| 6,888,940 | B1 | | 5/2005 | Deppen |
| 6,977,479 | B2 | | 12/2005 | Hsu |
| 2003/0087677 | A1 | | 5/2003 | Miller et al. |
| 2003/0096642 | A1 | | 5/2003 | Bessa et al. |
| 2003/0128010 | A1 | * | 7/2003 | Hsu ........................... 320/101 |
| 2005/0040192 | A1 | | 2/2005 | Steven, III et al. |
| 2005/0088141 | A1 | | 4/2005 | Lee et al. |
| 2005/0116684 | A1 | | 6/2005 | Kim |
| 2006/0087281 | A1 | * | 4/2006 | Tong ........................... 320/106 |
| 2006/0244420 | A1 | * | 11/2006 | Stanesti et al. ............ 320/128 |

FOREIGN PATENT DOCUMENTS

JP  2000253101       9/2000
JP  2003299257 A1 * 10/2003

* cited by examiner

*Primary Examiner* — Edward Tso
*Assistant Examiner* — Samuel Berhanu
(74) *Attorney, Agent, or Firm* — Lerner, David, Littenberg, Krumholz & Mentlik, LLP

(57) ABSTRACT

The present invention provides a recharging apparatus for use with portable electronic user devices such as cell phones, pagers, PDAs, as well as with portable battery powered devices such as flashlights. Charging circuitry is used to charge the user device battery from a battery of the recharging apparatus. The user is able to control the recharging process with a manual on/off switch that is part of the recharging apparatus. Optionally, a manual/automatic mode is provided that allows the user even greater flexibility over charging. Here, the user may select various conditions and options when recharging is permitted.

6 Claims, 10 Drawing Sheets

RECHARGING DEVICE FOR USE WITH PORTABLE ELECTRONIC DEVICES

CROSS-REFERENCE TO RELATED APPLICATIONS

This application claims the benefit of the filing date of U.S. Provisional Patent Application No. 60/790,999, filed Apr. 11, 2006, the disclosure of which is incorporated herein by reference.

BACKGROUND OF THE INVENTION

The present invention relates generally to portable rechargeable devices and, more particularly, to recharging devices for use with such portable devices.

There are all manner of battery-operated, portable electronic devices that are used in a wide range of applications. Nearly all of these devices need to be recharged. Some of the more common types of such electronic devices include mobile/cellular telephones ("cell phones"), one or two-way pagers, and personal digital assistants ("PDAs"). Flashlights are also another type of portable, battery powered devices that can be recharged. As these and similar devices have evolved over the years, the size and form factor of the devices has generally become smaller and smaller. However, one limiting factor in the size of such portable devices is the battery or batteries used to power the device.

Many different battery technologies have arisen in an attempt to meet the requirements of advanced portable electronic devices. Similarly, battery recharging technologies have been developed in order to enable users to recharge their battery powered devices while on the go. For example, a user has been able to place a battery or the device itself into a recharger that is plugged into a wall outlet or into a cigarette lighter adapter in an automobile.

More recently, mobile rechargers have been introduced that enable a user to recharge his or her electronic device while the electronic device is being carried by the person. Some mobile rechargers have been configured to include an on-board battery that is used to charge the battery of the mobile device. See, for instance, U.S. Pat. No. 5,859,481 to Banyas, U.S. Pat. No. 6,043,626 to Snyder et al., U.S. Pat. No. 6,184,654 to Bachner, III et al., and U.S. Patent Publication No. 2005/0116684 to Kim, the entire disclosures of which are incorporated by reference herein. U.S. Patent Publication No. 2003/0087677 to Miller et al., which also is incorporated by reference herein, discloses a supplemental power source that is part of the user device itself. The internal main and supplemental power sources may be recharged by an external recharger and power supply.

FIG. 1 shows a holder 15 for use with a cell phone 10 as described in the Snyder et al. patent. The cell phone 10 includes main housing 20, a battery 25 and an antenna 30. Contacts 35 provide connection to power circuitry of the cell phone 10. The holder incorporates an auxiliary battery 40 connected with a housing 55. The housing defines a cradle 53 for holding the cell phone 10. A rib on the housing 55 may be positioned to engage a corresponding slot 60 on the main housing 20 of the cell phone 10. A clip 45 on the holder 15 enables the user to attach the holder 15 to a belt. Contact 70 of the cradle 53 engages contact 35 of the cell phone 10, electrically connecting the auxiliary battery 40 to the cell phone 10. The cell phone 10 includes auxiliary battery sensor circuitry 80 that switches power between battery 25 of the cell phone 10 and the auxiliary battery 40 of the holder 15. As stated in the Snyder et al. patent at column 3, lines 49-54, "[s]witching between the batteries is responsive to changes in current initiated by placement or removal of the telephone unit 10 from the housing 55. The sensor circuitry 80 also switches power back to the main battery 25 should the charge of the auxiliary battery 40 become depleted."

The recharging devices of Snyder and the other references mentioned above are beneficial because they allow for charging the battery of a portable electronic device without the need for a connection to a fixed power supply, such as a wall outlet or an automobile cigarette lighter adapter. Unfortunately, while known recharging devices may be worn on a belt clip with a supplemental power source, such devices do not allow the user to control the rate of recharging or to manually disable or enable recharging at any time. Thus, it is desirable to provide a more robust recharging device which overcomes these and other problems.

SUMMARY OF THE INVENTION

In accordance with one embodiment of the present invention, a recharging apparatus is provided. In this embodiment, the recharging apparatus includes a charging controller, a manual recharging actuator such as a switch, and a cradle or other connector to a portable user device such as a cell phone, pager, PDA, flashlight, etc. Here, the manual recharging actuator is coupled between the charging controller and a battery or batteries of the recharging apparatus. Desirably, the manual recharging actuator is a switch or similar component that is able to open or close the circuit between the charging controller and the recharging battery. The user is able to select between a charging mode and a no charging mode. For instance, when the switch is set to "on" the electrical connection between charging controller and the recharging battery is a closed circuit. In this case, the charging controller is operable to charge the battery or batteries of the portable user device with the recharging battery. However, when the switch is set to "off" the electrical connection between charging controller and the recharging battery is an open circuit. In this case, the charging controller cannot charge the battery or batteries of the portable user device. Thus, the user has complete control over when and if recharging occurs.

In accordance with another embodiment of the present invention, a modified recharging apparatus is provided. Here, the charging controller may be, e.g., a processor such as a microprocessor or microcontroller that manages the recharging of the portable user device. In this embodiment, the manual recharging actuator preferably works in conjunction with another actuator that the user can place in either a manual mode or an automatic mode. One or both of the actuators may be switches or similar components. In this embodiment, the manual recharging switch and the auto/manual switch are preferably coupled to the processor. For instance, the two switches may be electrically and/or mechanically coupled to the processor.

In accordance with a further embodiment of the present invention, a recharging apparatus comprising a portable charging controller, a cradle and a mode actuator is provided. The portable charging controller is operable to recharge a battery of a user device from an independent power source provided by the recharging apparatus. The cradle holds the device and electrically connects the battery of the user device to the charging controller. The mode actuator is selectable between a plurality of charging modes. The user device is recharged according to one or more pre-selected conditions associated with respective charging modes.

Another embodiment of the present invention provides a portable recharging apparatus comprising a housing, a first receptacle within the housing for receiving a portable device having a main battery, and a second receptacle within the housing for receiving an auxiliary battery. At least one electrical contact may be disposed within the first receptacle, the electrical contact being operable to electrically connect the auxiliary battery to the portable device so that a charge of the auxiliary battery may be applied to the main battery of the portable device. A first actuator may be disposed relative to the housing for selecting a power mode of the apparatus, the power mode enabling or disabling charging, and a control unit may control flow of battery charge from the auxiliary battery to the main battery to recharge the main battery when in the enabling mode and to prevent recharge when in the disabling mode.

The apparatus of the above described embodiment may further comprise a second actuator within the housing for selecting an operation mode of the apparatus. Accordingly, the operation mode may be set to either an automatic mode and a manual mode, and the control unit may control the flow of battery charge from the auxiliary battery to the main battery in relation to the power mode and the operation mode of the apparatus. Alternatively or additionally, the apparatus may also include a mechanical connector portion attached to the housing, thereby enabling the apparatus to be attached to an article of clothing. The apparatus may also include a display positioned on the housing. The display may be operable to convey information relating to battery life, such as battery life of the auxiliary battery, and the display may turned off in relation to a charge of the auxiliary battery reaching a predetermined level. The display may otherwise be turned off in relation to a position of a third actuator. The apparatus may also include an electrical connector for connecting the auxiliary battery to an external power supply or charging device, so that a charge of the auxiliary battery may be restored via a charge applied by the external power supply or charging device through the electrical connector. Even further, the electrical connector may include one of a universal connector and multiple adaptor connectors to couple to various charging devices.

Yet another embodiment of the present invention provides a portable recharging apparatus for wireless telephones, comprising a housing, a first receptacle within the housing for receiving a wireless telephone having a main battery, and a second receptacle within the housing for receiving an auxiliary battery. At least one electrical contact may be disposed within the first receptacle, the electrical contact being operable to electrically connect the auxiliary battery to the wireless telephone so that a charge of the auxiliary battery may be applied to the main battery of the wireless telephone. A first actuator may reside within the housing for setting a power mode of the apparatus to one of an on mode and an off mode, and a second actuator may also reside within the housing for setting an operation mode of the apparatus to one of an automatic mode and a manual mode. A processor may be coupled to the first actuator and the second actuator, wherein the processor determines a power mode setting based on a setting of the first actuator and an operation mode setting based on a setting of the second actuator, and controls charging of the portable device in relation to the power mode setting and the operation mode setting. The processor may control charging of the battery operated portable device in relation to a predetermined event, for example, when a charge of the main battery reaching a predetermined level.

An even further embodiment of the present invention provides a portable recharging apparatus, including a housing for receiving a device, an auxiliary power supply, means for electrically connecting the auxiliary power supply to a main power supply of the device, mode setting means for setting at least one of a power mode and an operation mode of the device, and control means for controlling supply of charge from the auxiliary power supply means to the main power supply based on a setting of the mode setting means. Also included may be a means for charging the auxiliary power supply from an external device.

A method according to an embodiment of the present invention provides for recharging a battery operated portable device. An initial step may be determining a power mode of a recharge apparatus, the power mode being set to either an on state or an off state, and then determining an operation mode of the recharge apparatus, the operation mode being set to either an automatic state or a manual state. Further steps may include determining a charge level of a main battery of the portable device, and applying charge from an auxiliary battery to the main battery of the portable device. The charge may be used to recharge the main battery when either the power mode is set to the on state, or the operation mode is set to the automatic state, and the charge level of the main battery is below a predetermined level.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 1:
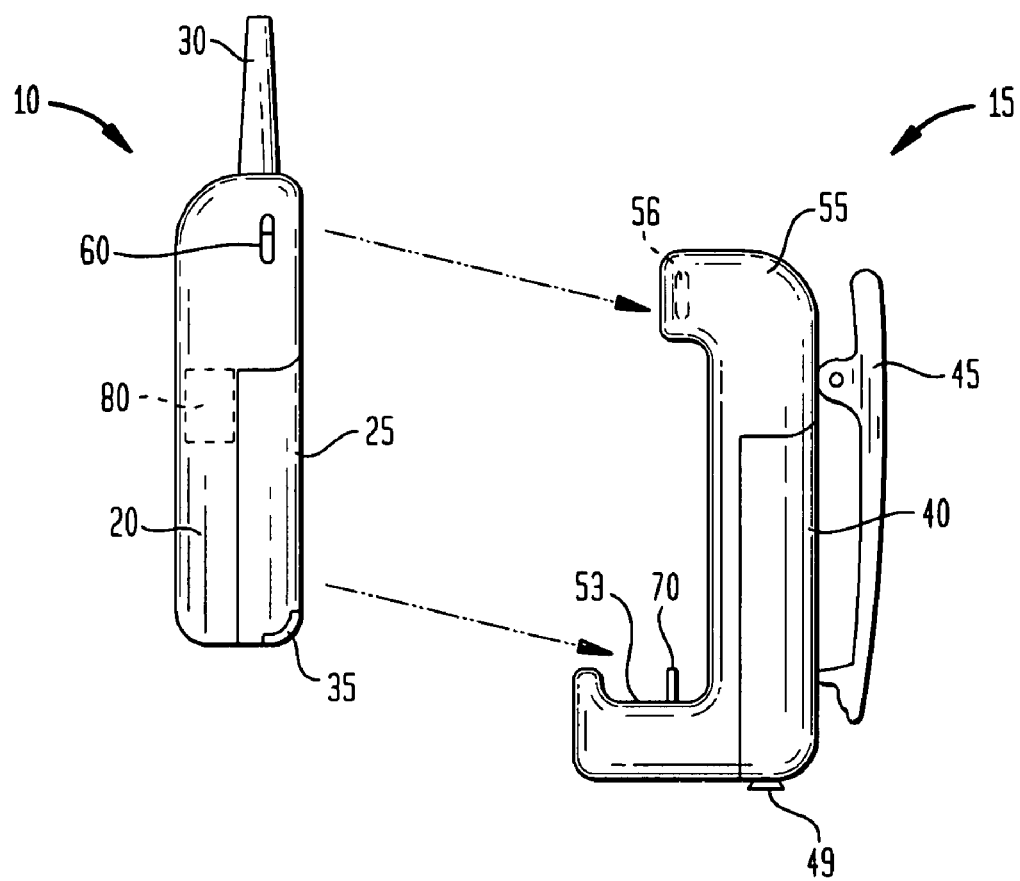
FIG. 1 illustrates a known system for recharging a portable electronic device.
Figure 2:
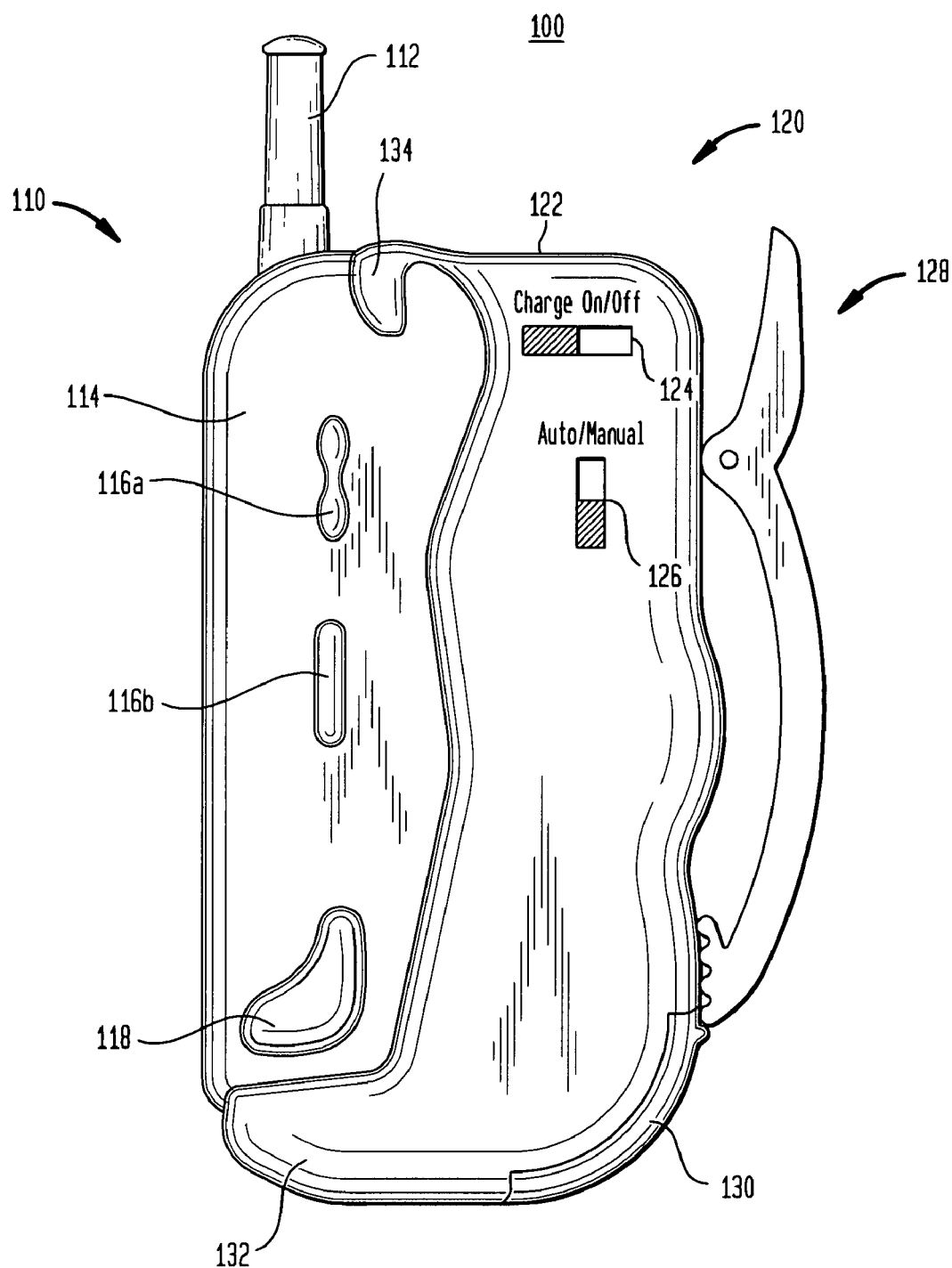
FIG. 2 illustrates a recharging system in accordance with an embodiment of the present invention.

FIG. 2 illustrates a system 100 for recharging portable electronic devices. The system 100 is shown with a cell phone 110 connected to recharging apparatus 120. The cell phone 110 may be the same or different than the cell phone 10 illustrated in FIG. 1. The cell phone 110 may include an antenna 112 and a housing 114. The housing 114 may include one or more buttons, switches or other actuators 116a and 116*b* for operating the cell phone 110. While two actuators 116*a* and 116*b* are shown, any number of actuators may be employed. A receptacle 118 may include headphone and/or speakerphone jacks, which may be useful in "hands free" operation. As with cell phone 10, the cell phone 110 may include a battery, battery contacts, and battery sensor circuitry (not shown).

Of course, while cell phone 10 is illustrated, it should be understood that many other types of portable electronic devices may be used with the recharging apparatus 120. By way of example only, the recharging apparatus 120 may be used with one- or two-way pagers, walkie-talkies, PDAs, tablet personal computers, barcode scanners, etc. The recharging apparatus 120 may also be used with portable battery powered devices that may not include electronic circuitry, such as flashlights and other devices.

As shown in FIG. 2, the recharging apparatus 120 includes a housing 122 and an actuator 124. The actuator 124 is used to select whether the battery of the cell phone 10 or other portable battery powered device will be recharged by the recharging apparatus 120. The recharging apparatus 120 may also include a second actuator 126 for switching between manual and automatic recharging modes. The actuators may be any kind of selecting mechanism, including a mechanical selector such as a switch, toggle, dial, jog shuttle or slide button. Alternatively, the selecting mechanism may be an electronic selector such as a programmable "soft button" or "soft key" that may be interoperable with a user interface of the recharging apparatus. The operation and function of the actuators 124 and 126 will be explained in more detail below.

Preferably, the recharging apparatus 120 includes a clip or other connector 128 to enable the user to wear the recharging apparatus 120 on his or her belt or clothing, or to secure the recharging apparatus 120 to luggage such as a briefcase or backpack. The recharging apparatus 120 may also include a receptacle 130 for receiving a battery (not shown) therein. The receptacle 130 may be opened so that a user may replace or exchange the battery.

Figure 3:
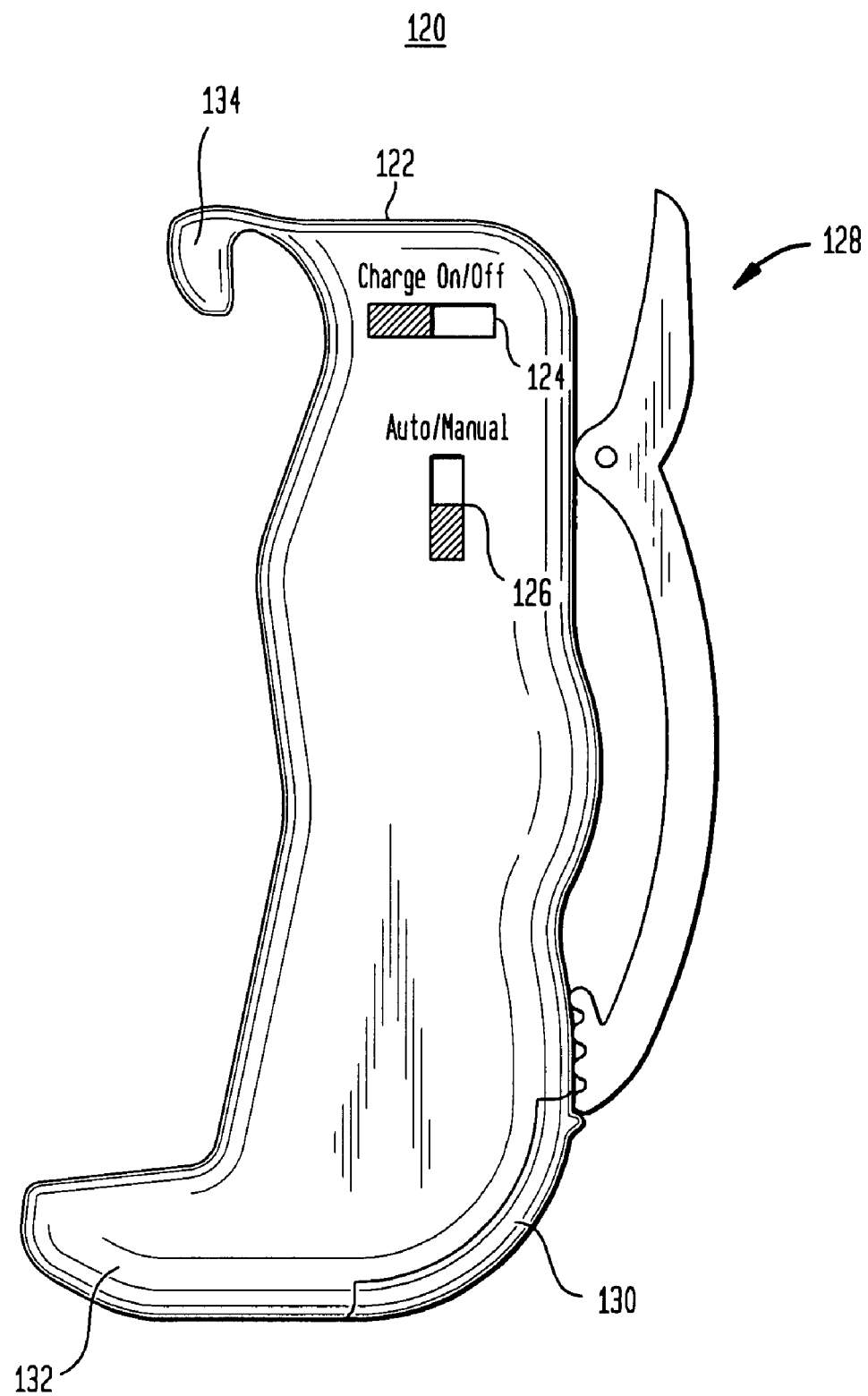
FIG. 3 is a side view of the recharger as shown in FIG. 2.
Figure 4:
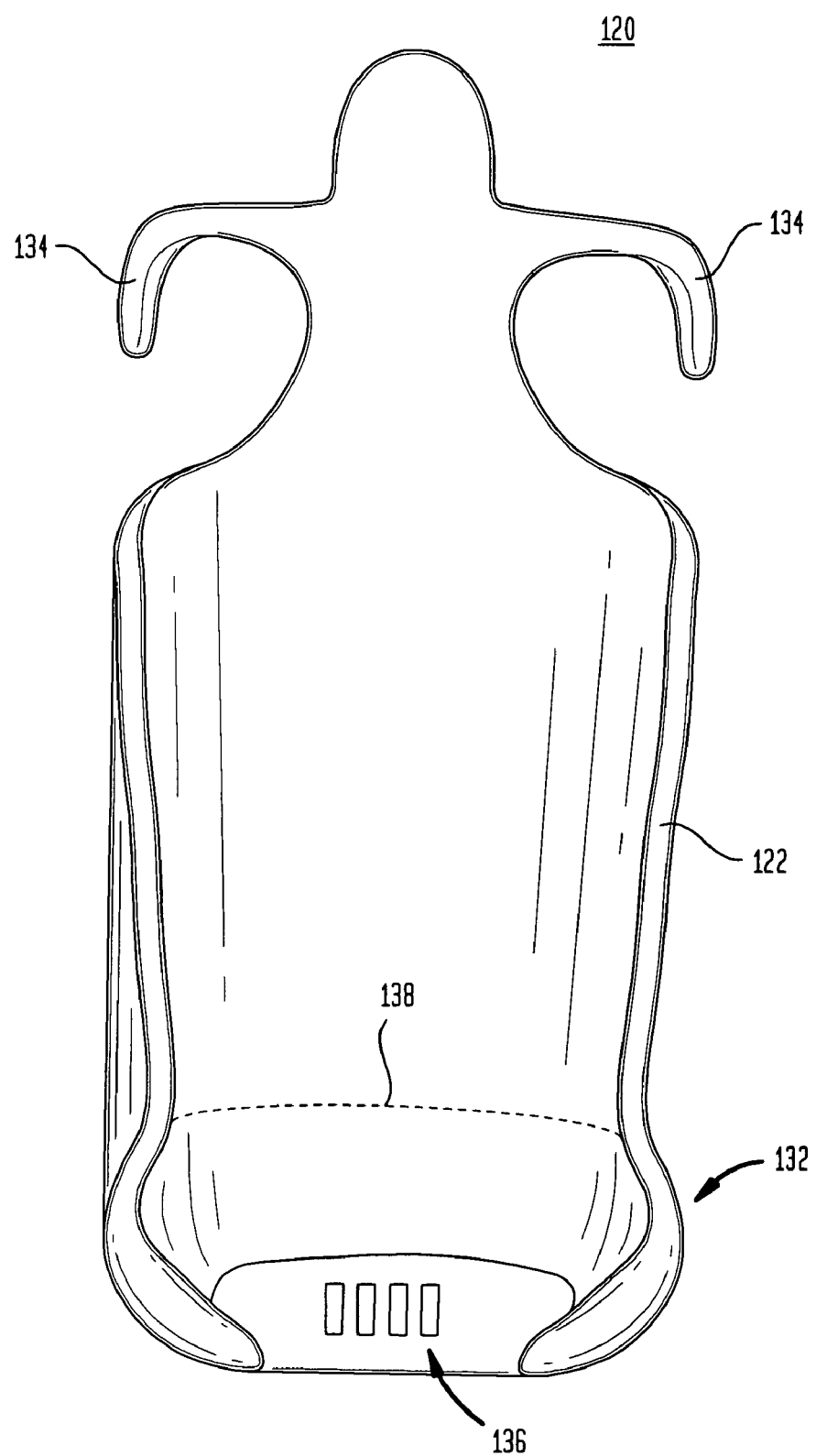
FIG. 4 is a front view of the recharger as shown in FIG. 3.

FIGS. 3 and 4 illustrate side and front views, respectively, of the recharging apparatus 120. As seen here, the housing 122 of the recharging apparatus 120 desirably includes a cradle portion 132 in which the cell phone 110 or other device may sit. One or more connectors 134 may be used to further secure the cell phone 110 to the recharging apparatus 120. While FIGS. 3-4 show the recharging apparatus 120 having a specific size and shape, it should be understood that the recharging apparatus 120 is not limited to this particular size and shape, and may instead be of any configuration and design such that it can connect to a user's device for recharging the device.

As seen in FIG. 4, the recharging apparatus 120 preferably includes one or more contacts 136 for connecting to the cell phone 110 or other rechargeable device. Four contacts 136 are shown, however, any number of contacts may be provided, depending upon the type of rechargeable device that is utilized and the operations it performs. For instance, aside from recharging the portable device's battery, recharging apparatus 120 may also be able to exchange data with the portable device. In this case, the recharging apparatus 120 may also be used to couple the portable device to another device such as a laptop computer.

While it is desirably for the recharging apparatus 120 to be a "universal" apparatus that is able to work with user devices of many different sizes or shapes, there are so many different types of devices having such a wide variety of configurations that it may not be possible for a single recharging apparatus 120 to work universally. For instance, cell phone manufacturers such as Motorola, Nokia and Samsung may each offer dozens of different models having different form factors. Each model may have a unique or non-standard set of connectors.

Thus, in one alternative, the cradle portion 132 of the recharging apparatus 120 is replaceable or interchangeable so that the user may swap one cradle portion 132 for another, depending upon the type of device he or she is using. Dashed line 138 shows one example of where the cradle 132 may connect to the main portion of the housing 122. Different cradle portions 132 may have different form factors to mate with different user devices. Furthermore, different cradle portions 132 may have the same form factor but different arrangements of contacts 136.

Figure 5:
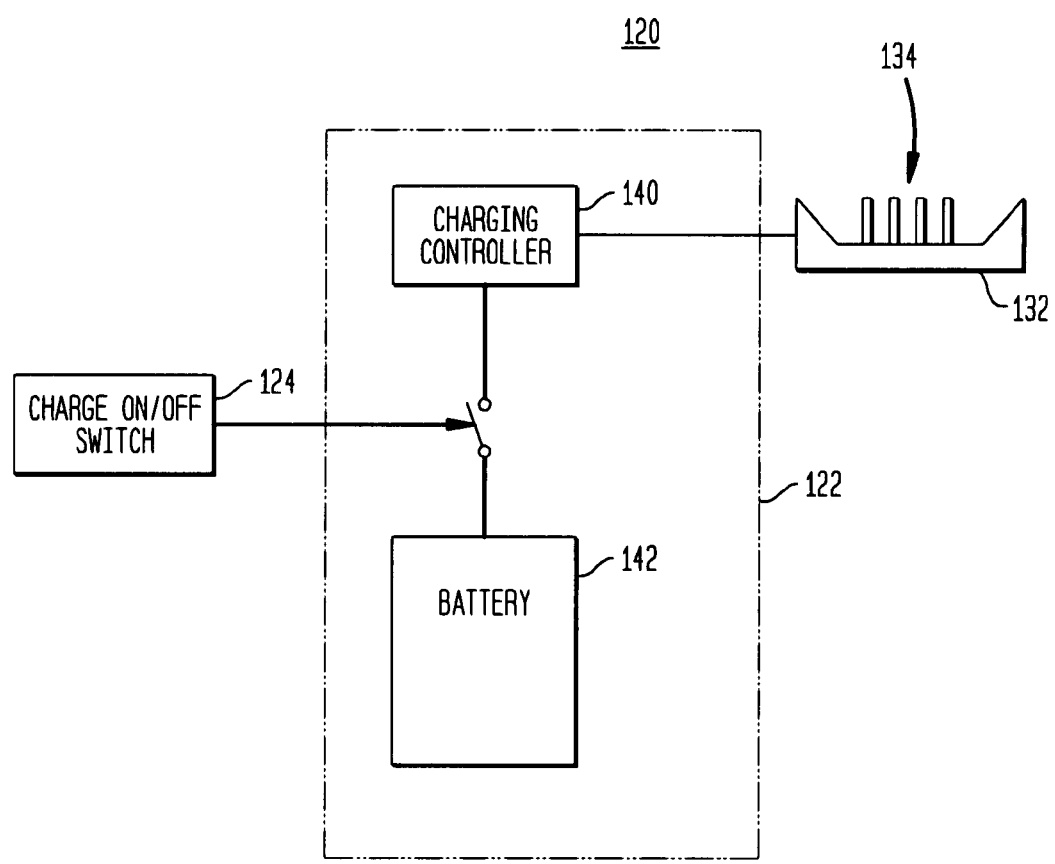
FIG. 5 is a schematic diagram of charging circuitry in accordance with an embodiment of the present invention.

FIG. 5 is a schematic representation of circuitry for recharging a battery of a user device in accordance with a preferred embodiment of the present invention. Preferably, a charging controller 140 is disposed within the housing 122 of the recharging apparatus 120. As is known in the art, there are different devices which can be used to recharge a battery. The present invention is not limited to any particular device or devices that provide current to the battery of a user device. By way of example only, the Fairchild Semiconductor FAN7563 or FAN7564 controllers, or the National Semiconductor LM3647 controller may be employed as the charging controller 140.

As shown in FIG. 5, battery 142 may also be located within the housing 122. In one alternative, the battery 142 may be considered as an auxiliary battery in the sense that it is used to recharge the user device battery and not to power the user device directly. In other alternatives, the battery 142 may be used as a backup battery that is capable of directly powering the user device during normal operation if the battery of the user device is low, inoperable or missing. The battery 142 may be removable or may permanently reside in the housing 122. The charging controller 140 is connected to both the battery 142 and the cradle portion 132. When the user device, such as cell phone 110, is coupled to the recharging apparatus 120, at least some of the connectors 134 of the cradle portion 132 are in electrical contact with the power connectors on the battery of the user device. The charging controller 140 is operable to charge the battery of the user device using the battery 142.

In the embodiment of FIG. 5, the actuator 124, which is shown as a "charge on/off switch", is positioned so as to electrically couple (or uncouple) the battery 142 from the charging controller 140. When the user desires that the user device battery be charges, he or she can enable the actuator 124 in the on mode. In this case, the on/off switch of FIG. 5 would be placed in a closed circuit mode, providing an electrical connection between the battery 142 and the charging controller 140. In turn, the charging controller 140 can then charge the user device battery in a known manner. The user could leave the actuator 124 in the on mode to enable the battery 142 to "trickle charge" the user device battery.

However, as explained above, continuously charging the battery of the user device is undesirable in many situations, as it depletes the charge in the battery 142 of the recharging apparatus 120. Thus, the actuator 124 enables the user to disable charging by placing the on/off switch of FIG. 5 in an open circuit mode. Here, the battery 142 is decoupled from the charging controller 140 and no charging of the user device battery by the recharging apparatus 120 may take place.

Figure 6:
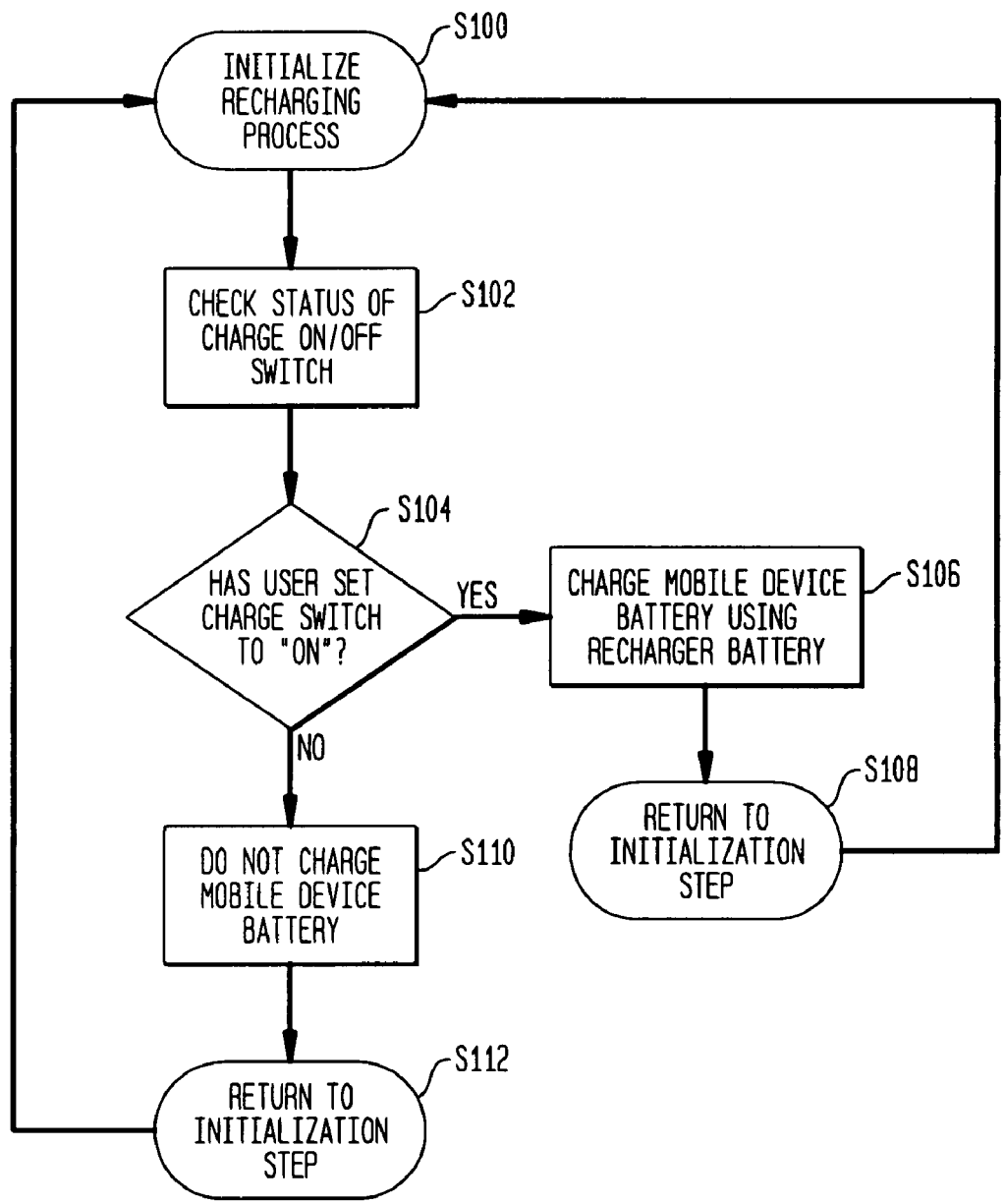
FIG. 6 is a flow diagram illustrating a recharging process in accordance with the embodiment shown in FIG. 5.

This operation is shown in the flow diagram of FIG. 6. Here, the recharging process is initialized at step S100. The status of the charge on/off switch is checked at step S102. A determination is made at step S104 as to whether the switch is set to on or off. If it is set to on, the process continues at step S106, where the mobile device battery is recharged by the charging controller 140 as described above. Then, when recharging is complete at step S108, the process returns to initialization step S100. Alternatively, if the switch is set to off, the process proceeds to step S110. Here, an open circuit condition occurs as described above, and no recharging takes place. Step S112 returns the process to initialization step S100.

The actuator 124 provides the user with the flexibility and freedom to choose whether and when to charge the user device battery. For instance, the user may monitor the status of the battery of the user device directly, e.g., by observing how "full" the battery is on a display of the user device. The user may also monitor the status of the battery 142. This may be done via a display 144 on the recharging apparatus 120. The display 144 may be, e.g., an LED, or may be part of a more elaborate user interface such as an LCD display. Based upon information about the user device battery, the battery 142, or both, the user may choose to place the actuator 124 in the on or the off mode.

Figure 7:
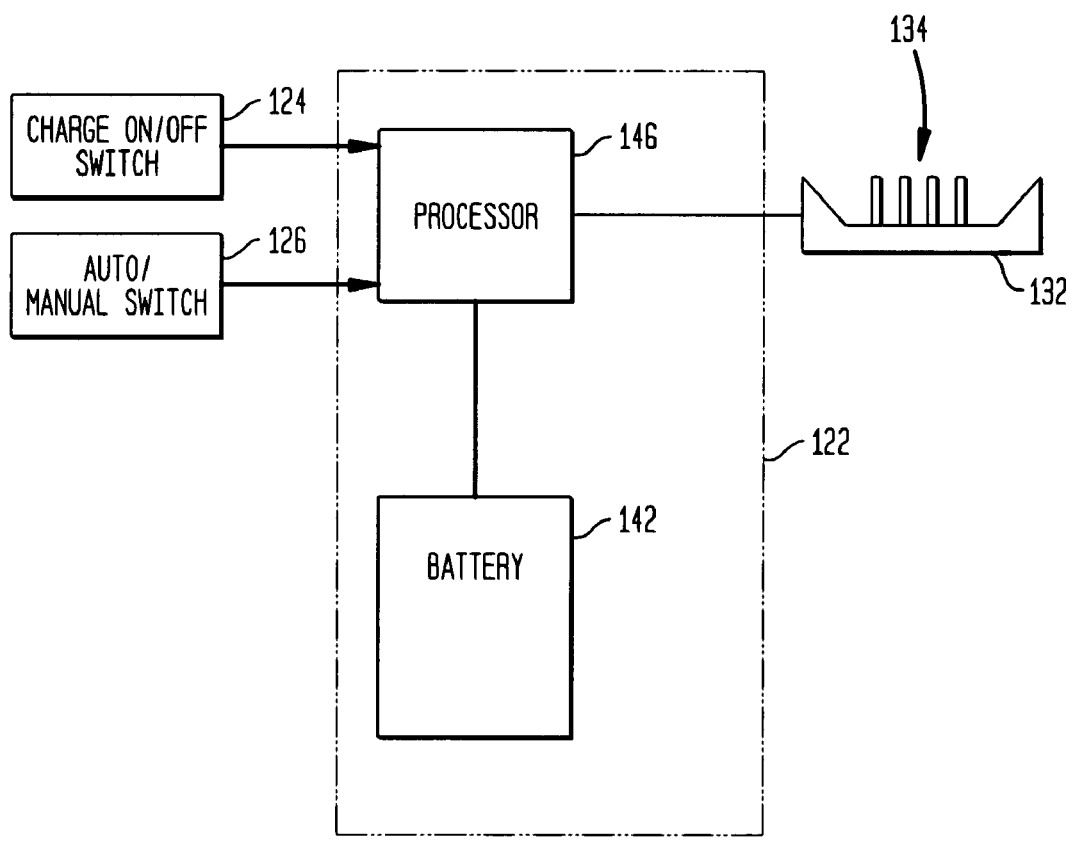
FIG. 7 is a schematic diagram of charging circuitry in accordance with another embodiment of the present invention.

In some situations, it may be cumbersome or inefficient for the user to monitor the status of the user device battery on an ongoing basis. For instance, the user device may be placed in a backpack, briefcase or other luggage, or may be otherwise inaccessible to the user. Thus, in an alternative embodiment of the present invention, the recharging device 120 may also include actuator 126, as shown in FIG. 7. In this embodiment, the battery 142 may be coupled to a charging controller such as processor 146. The processor 146 may be a microprocessor, microcontroller, ASIC or similar processing device that is configured to control charging of the user device battery. By way of example only, the National Semiconductor COP8ACC5 microcontroller may be used as the processor 146.

Here, unlike the previous embodiment, the actuator 124 does not necessarily provide a direct physical on/off connection between the battery 142 and the charging controller 140. Instead, the actuator 124 and the actuator 126 are preferably coupled to the processor 146. In this case, the processor 146 may check the status of the actuator 126 to see whether it is set to automatic mode or manual mode. If set to automatic mode, the processor 146 preferably enables charging of the user device battery in a conventional manner. If the actuator 126 is set to manual mode, the processor 146 then checks the status of the actuator 124.

In this case, when the actuator 124 is placed in the on position, the processor 146 is instructed to enable charging of the user device battery with the battery 142. Conversely, when the actuator 124 is placed in the off position, then the processor 146 will function as though there is an open circuit between it and the battery 142, preventing charging of the user device battery.

Figure 9A:
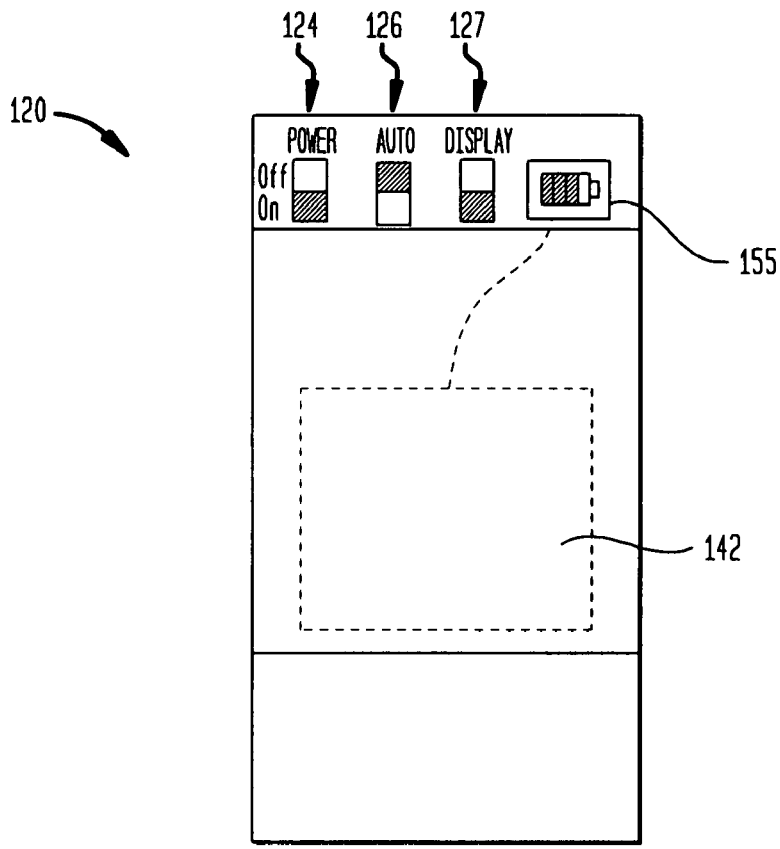
FIG. 9A is a front view of the recharging system in accordance with another embodiment of the present invention.
Figure 9B:
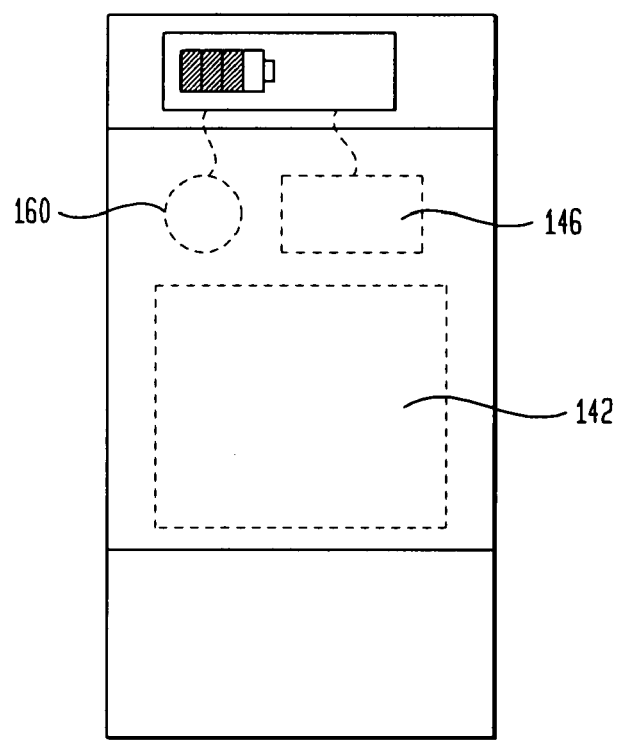
FIG. 9B is a front view of the recharging system in accordance with another embodiment of the present invention.

According to one embodiment of the present invention, illustrated in FIGS. 9A and 9B, the recharging apparatus 120 may include a display 155. The display 155 may be used to display information relating to, inter alia, remaining charge of the auxiliary battery 142, remaining charge of the user device 110, status of recharging operation of user device 110, current time and date, mode settings of the apparatus 120, or whether the auxiliary battery 142 is being recharged by another power source. The display 155 may be a liquid crystal display (LCD), a light emitting diode (LED), plasma, or any other variety of display. Furthermore, the display 155 may include a controller for directing the functions of the display 155, or it may be controlled by the processor 146.

As shown in FIG. 9A, the display 155 may be powered by the auxiliary battery 142 via a direct or indirect electrical connection. Because it may be undesirable to continually power the display 155 with the auxiliary battery 142, especially when a charge of the auxiliary battery 142 is running low, the display 155 may be turned off by the user. For example, a third actuator 127 may be manipulated by the user to open a circuit running from the auxiliary battery 142 to the display 155, thereby cutting power to the display 155. Alternatively or additionally, the display 155 may be electrically connected to the processor 146, and the processor 146 may turn off the display 155 at a predetermined time. For example, the display 155 may be automatically turned off if the charge of the battery supplying its power is too low and falls below a predetermined threshold, such as 25% power remaining, 15% power remaining, etc.

In an alternative embodiment shown in FIG. 9B, the display 155 may be powered by a separate display battery 160, such as a watch battery. In this regard, the display 155 would not drain the power from the auxiliary battery 142. However, this display 155 may still be turned off by the user via an actuator or automatically by the processor 146. The battery 160 may also be rechargeable as with the portable device battery.

Figure 8:
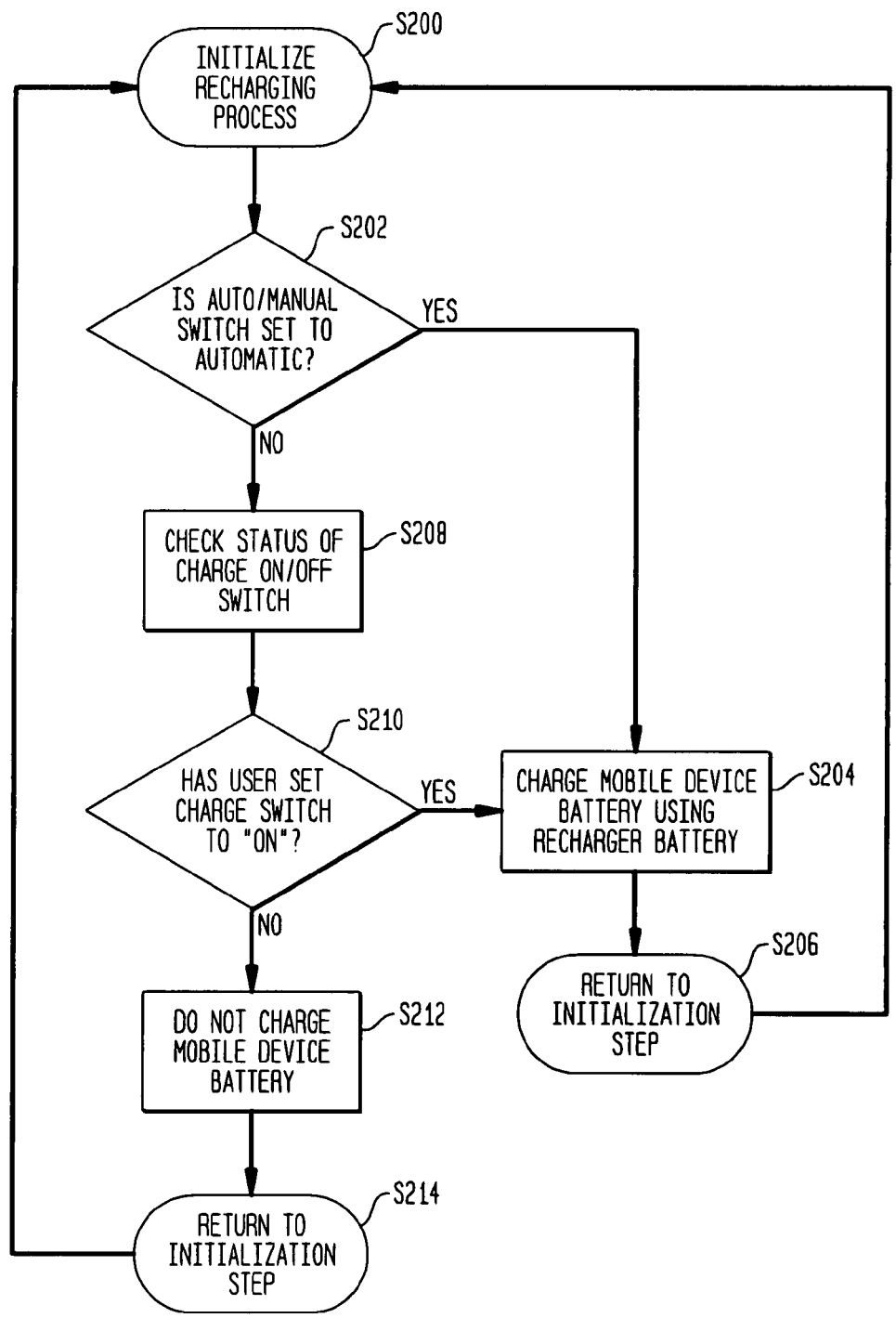
FIG. 8 is a flow diagram illustrating a recharging process in accordance with the embodiment shown in FIG. 7.

Operation of the recharging apparatus 120 according to the present embodiment is shown in the flow diagram of FIG. 8. Here, the recharging process is initialized at step S200. The status of the auto/manual actuator 126 is checked at step S202. If the actuator 126 is set to auto mode, the process proceeds to step S204, where the mobile device battery is recharged by the processor 146 as described above. Then, when recharging is complete at step S206, the process returns to initialization step S200.

If the actuator 126 is set to manual mode, then the process proceeds to step S208, where the status of the charge on/off actuator 124 is checked. A determination is made at step S210 as to whether the actuator 124 is set to on or off. If it is set to on, the process proceeds to step S204, where the mobile device battery is recharged. Alternatively, if the actuator 124 is set to off, the process proceeds to step S212. Here, an open circuit condition occurs as described above, and no recharging takes place. Step S214 returns the process to initialization step S200.

As discussed above, if the actuator 126 is set to automatic mode, it is preferable for the processor 146 to enable charging of the user device battery. Alternatively, the processor 146 may be programmed to enable charging if one or more conditions are met. The condition may be a predetermined threshold that may be set by the manufacturer or vendor of the recharging apparatus 120. Alternatively, the condition(s) may also be set by the user. By way of example only, the user may program or otherwise instruct the processor 146 to enable charging of the user device battery only if the user device battery is X percent full, wherein X may be any percent from 0 to 100, such as 25%, 50%, 75%, etc. Such instruction may be provided through a user interface such as a graphical user interface. Alternatively, the user may use buttons, dip switches or other actuators associated with the recharging apparatus to select recharging conditions as desired.

It is also possible for the processor 146 to enable charging if other conditions are met. One such condition may be the status of the battery 142. The processor 146 may be configured to charge the user device battery so long as there is sufficient charge in the battery 142. By way of example only, the processor 146 may charge the user device battery so long as the battery 142 is at least Y percent full, where Y may be any percent from 0 to 100, such as at least 10%, or 25%, 50%, etc. The processor 146 may also compare the fullness of the battery 142 with the user device battery. Here, for instance, if the user device battery holds more charge than the battery 142, the processor 146 may prevent recharging of the user device battery. Such conditions may be preprogrammed by the recharging device 120 manufacturer, or the user may select conditions in any of the manners described above.

Thus, it can be seen that the user may pre-program or pre-select the recharging apparatus 100 in various ways so that the user device battery is recharged as desired. This provides a great deal of flexibility to the user, and enables him or her to maintain control over how and when recharging takes places.

While the processes described above for recharging entailed only a single user device, it should be understood that the recharging methods according to the present invention may be extended to any number of user devices. For instance, the recharging device 120 may be configured to include multiple cradles 132 that can be used to recharge multiple user devices sequentially or simultaneously. Here, the user may select which devices to recharge, and whether to recharge them together or in some particular order.

Figure 10A:
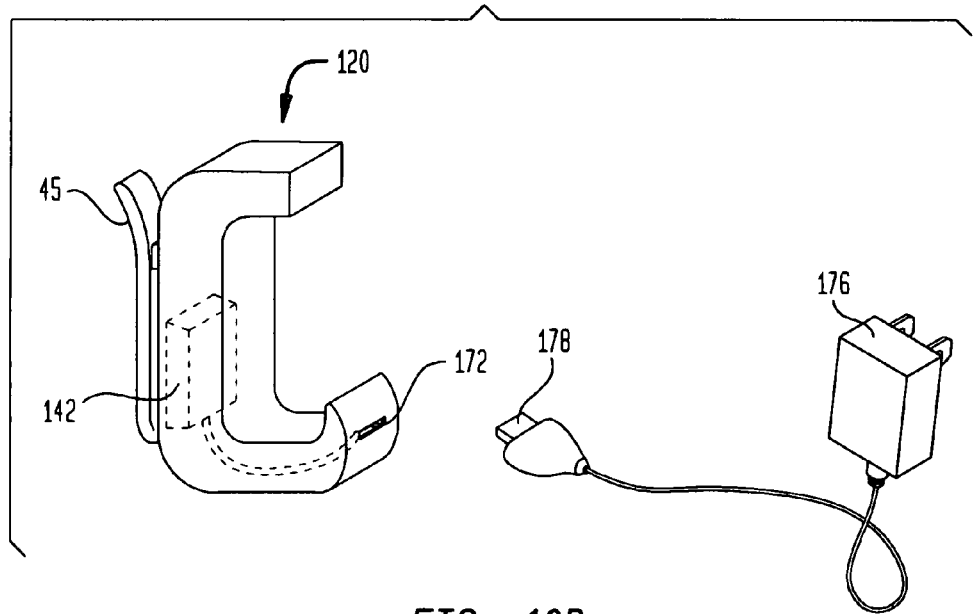
FIG. 10A is a perspective view of a recharging system according to an embodiment of the present invention.

It is also possible to connect the recharging device 120 to a wall outlet, to an automobile DC power supply, or to some other external power supply, such as a device specific charger. For example, FIG. 10A illustrates a charger 176 corresponding to the recharge apparatus 120. This charger 176 may include a charge plug 178 to engage an electrical connection 172 of the recharge apparatus 120.

Figure 10B:
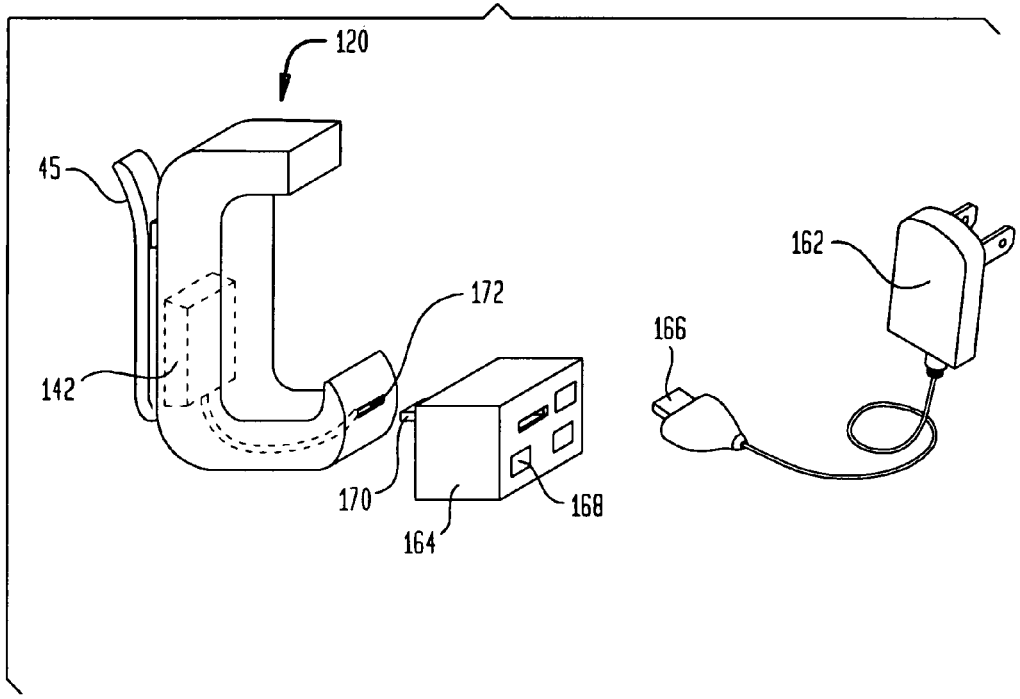
FIG. 10B is a perspective view of a recharging system according to another embodiment of the present invention.

As an alternative embodiment, illustrated in FIG. 10B, a conventional portable electronic device charger 162, which is typically supplied with cellular phones, PDAs, and the like, may be used to charge the apparatus 120. The charger 162 has a charge plug 166. However, because of the wide variety of cell phones and other wireless devices offered, there are many different shapes and sizes and forms of corresponding charge plugs 166. Accordingly, one embodiment of the present invention provides for an adapter 164 which may be used to connect any charge plugs 166 to the recharge apparatus 120. For example, the adaptor 164 may be a universal connector including one receptacle adapted to receive various charge plugs or a plurality of different receptacles, each adapted to receive a charge plug having a different dimension, number of pins, power configuration, etc. Thus, charge plug 166 may be inserted into a corresponding adaptor input 168 that is configured to receive that type of charge plug 166. Different adaptor inputs 168 may be provided for different charge plugs 166. Male/female connector 170 of the adaptor 162 may then be inserted into female/male connector 172 of the recharge apparatus 120. Thus, power may be supplied through the conventional charger 162 and the adapter 164 to the recharge apparatus 120.

Alternatively, the adapter 164 may comprise a number of individual connectors suitable to couple to different manufacturers' chargers. The appropriate individual connector is chosen to mate with a corresponding charger 162. In another alternative, the adapter 164 is configured to receive a universal serial bus (USB) cable so that the battery 142 may be recharged when plugged into a computing device, such as a personal computer, via the USB cable.

The external power supply may be used to charge the battery 142. Optionally, the external power supply may be used to charge the user device battery directly. This situation is useful when the battery 142 itself needs charging, or the battery 142 is not available.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A portable recharging apparatus for wireless telephones, comprising:
    a housing;
    a first receptacle within the housing for receiving a wireless telephone having a main battery;
    a second receptacle within the housing for receiving an auxiliary battery;
    at least one electrical contact within the first receptacle, the electrical contact being operable to electrically connect the auxiliary battery to the wireless telephone so that a charge of the auxiliary battery may be applied to the main battery of the wireless telephone;
    a first mode actuator within the housing for setting a power mode of the apparatus to one of an on mode and an off mode;
    a second mode actuator within the housing for setting an operation mode of the apparatus to one of an automatic mode and a manual mode; and
    a processor, the processor being coupled to the first actuator and the second actuator, wherein the processor determines a power mode setting based on a setting of the first actuator and an operation mode setting based on a setting of the second actuator, and controls charging of the portable device in relation to the power mode setting and the operation mode setting;
    wherein if the manual mode of the second mode actuator is selected, the user device battery is recharged when the on mode of the first mode actuator is selected, and if the automatic mode of the second mode actuator is selected, the user device is recharged according to one or more pre-selected conditions.

2. The apparatus of claim 1, wherein the pre-selected condition includes a charge of the main battery reaching a predetermined level.

3. A method for recharging a battery operated portable device, comprising:
    determining a power mode of a recharge apparatus, the power mode being set to either an on state or an off state;
    selecting via a mode actuator an operation mode of the recharge apparatus, the operation mode being set to either an automatic state or a manual state;
    selecting a condition for which charge is to be applied from an auxiliary battery to the main battery of the portable device;
    determining a charge level of a main battery of the portable device;
    applying charge from the auxiliary battery to the main battery of the portable device, the charge being used to recharge the main battery, when either:
    the mode actuator is set to a manual state operation mode and the power mode is set to the on state, or
    the automatic state operation mode is selected and the charge level of the main battery is below a predetermined level and the selected condition is met.

4. A recharging apparatus, comprising:
    a portable charging controller operable to recharge a battery of a user device from an independent power source provided by the recharging apparatus;
    a cradle for holding the device and electrically connecting the battery of the user device to the charging controller;

a user selection actuator selectable between an open circuit mode and a closed circuit mode, the closed circuit mode providing an electrical connection between the independent power source and the charging controller for recharging the battery of the user device, and the open circuit mode disabling the electrical connection between the power source and the charging controller to prevent recharging of the user device battery; and a mode actuator for selecting between manual and automatic modes, wherein if the manual mode is selected, the user device battery is recharged when the closed circuit mode of the user selection actuator is selected, and if the automatic mode is selected, the user device is recharged according to one or more pre-selected conditions.

5. A portable recharging apparatus for recharging a mobile device having a main battery, comprising:

a housing;

an auxiliary battery within the housing;

a first electrical connector electrically coupled to the auxiliary battery and being adapted for electrical connection to the mobile device;

a manually operated switch disposed on the housing for switching the rechargeable apparatus from a non-recharging state to a ready to recharge state; and a control unit for controlling flow of charge from the auxiliary battery to the main battery according to a pre-selected condition relating to the charge level of the auxiliary battery and the charge level of the main battery to recharge the main battery when the electrical connector is connected to the mobile device and the rechargeable apparatus is in the ready to recharge state, wherein charging of the main battery from the auxiliary battery is enabled only if the charge level of the main battery is less than a predetermined percentage of its full capacity, wherein the predetermined percentage of the the main battery capacity is set by a user.

6. The portable recharging apparatus of claim 5, wherein the predetermined percentage is set via a graphical user interface.

* * * * *

UNITED STATES PATENT AND TRADEMARK OFFICE
CERTIFICATE OF CORRECTION

| | | |
|---|---|---|
| PATENT NO. | : 8,013,572 B2 | Page 1 of 1 |
| APPLICATION NO. | : 11/784271 | |
| DATED | : September 6, 2011 | |
| INVENTOR(S) | : Andrew Rodgers | |

It is certified that error appears in the above-identified patent and that said Letters Patent is hereby corrected as shown below:

At column 12, line 14, after "the" delete "the".

Signed and Sealed this
Eleventh Day of September, 2012

David J. Kappos
*Director of the United States Patent and Trademark Office*